ced by examiner

(12) United States Patent
Isoshima et al.

(10) Patent No.: US 11,274,627 B2
(45) Date of Patent: Mar. 15, 2022

(54) SPARK IGNITION ENGINE

(71) Applicant: KUBOTA Corporation, Osaka (JP)

(72) Inventors: Hiroaki Isoshima, Sakai (JP); Takeshi Kawasaki, Sakai (JP); Yuichiro Yamada, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/096,933

(22) Filed: Nov. 12, 2020

(65) Prior Publication Data
US 2021/0189994 A1 Jun. 24, 2021

(30) Foreign Application Priority Data

Dec. 20, 2019 (JP) .............................. JP2019-230943

(51) Int. Cl.
F02F 1/24 (2006.01)
F02F 11/00 (2006.01)
F02P 3/02 (2006.01)

(52) U.S. Cl.
CPC ............ *F02F 1/242* (2013.01); *F02F 11/002* (2013.01); *F02P 3/02* (2013.01)

(58) Field of Classification Search
CPC .. F02F 1/242; F02F 11/002; F02F 1/24; F02P 3/02
See application file for complete search history.

(56) References Cited

U.S. PATENT DOCUMENTS

| 5,003,958 | A | 4/1991 | Yoneyama et al. | |
| 6,332,458 | B1* | 12/2001 | Shimada | F02P 13/00 |
| | | | | 123/634 |
| 2004/0123591 | A1* | 7/2004 | Yoshida | F02F 7/006 |
| | | | | 60/305 |
| 2010/0242932 | A1 | 9/2010 | Nakano et al. | |
| 2014/0150746 | A1 | 6/2014 | Valencia et al. | |
| 2015/0380155 | A1* | 12/2015 | Kanithi | F02P 13/00 |
| | | | | 123/634 |

FOREIGN PATENT DOCUMENTS

| CN | 207847798 U | 9/2018 |
| JP | 2009287525 A | 12/2009 |
| JP | 2010-255621 A | 11/2010 |

OTHER PUBLICATIONS

Extended European Search Report dated Apr. 26, 2021 in European Application No. 20205145.4.

* cited by examiner

*Primary Examiner* — Jacob M Amick
(74) *Attorney, Agent, or Firm* — Panitch Schwarze Belisario & Nadel LLP

(57) ABSTRACT

A cylindrical part capable of supporting an ignition-coil-integrated plug cap is formed on a head cover so as to correspond to a plug hole of a cylinder head. The cylindrical part is formed by fitting and fixing a pipe material to a mounting hole part formed in the head cover, the mounting hole part facing the plug hole.

20 Claims, 7 Drawing Sheets

SPARK IGNITION ENGINE

CROSS-REFERENCE TO RELATED APPLICATION

This application claims priority under 35 U.S.C. § 119(b) to Japanese Patent Application No. 2019-230943, filed Dec. 20, 2019, the disclosure of which is incorporated herein by reference in its entirety.

BACKGROUND OF THE INVENTION

Field of the Invention

The present invention relates to a spark ignition engine.

Description of Related Art

As a spark ignition engine having an ignition-coil-integrated plug cap, deep plug holes to which spark plugs are screwed are formed in a cylinder head so as to correspond to cylinders, and four ignition-coil-equipped plug caps are fitted to and supported by a plug cap attachment flange having extension cylindrical parts for each cylinder.

That is, the plug cap attachment flange is mounted on the cylinder head as a component different from a head cover, and the ignition-coil-equipped plug caps are inserted and mounted to the four extension cylindrical parts of the plug cap attachment flange.

SUMMARY OF THE INVENTION

In conventional art, the ignition-coil-integrated plug caps are mounted on the cylinder head using a dedicated plug cap attachment flange for supporting the ignition-coil-integrated plug caps and a gasket for the plug cap attachment flange, which accordingly increases cost from the viewpoint of man-hours for assembly.

An object of the present invention is to provide a spark ignition engine which is advantageous in terms of cost and/or man-hours for assembly by further improving a structure for supporting a plug cap such as an ignition-coil-integrated plug cap.

In the present invention, a cylindrical part capable of supporting a plug cap connected to an ignition coil, is formed on a head cover so as to correspond to a plug hole of a cylinder head.

It is favorable that the cylindrical part is formed by fitting and fixing a pipe material to a mounting hole part formed in the head cover, the mounting hole part facing the plug hole. Further, it is more favorable that the pipe material is inserted in the mounting hole part by press-fitting.

It is preferable that a fixing unit for preventing the plug cap supported by the cylindrical part from being detached from the cylindrical part is provided on an outer wall of a valve operating mechanism housing part in the head cover.

In this case, it is more preferable that the plug cap is an ignition-coil-integrated plug cap having an ignition coil, and the fixing unit includes a female screw part for screwing a coil housing part of the ignition-coil-integrated plug cap supported by the cylindrical part, the female screw part being formed on the outer wall.

It is favorable that a bracket screwed to the coil housing part is bolted to the female screw part.

In addition, a punch hole corresponding to the plug hole may be formed in a head cover gasket provided between the cylinder head and the head cover.

According to the present invention, the cylindrical part that supports the plug cap connected to the ignition coil is formed on the head cover so as to correspond to the plug hole of the cylinder head, whereby a plug cap attachment flange that is a separate member is unnecessary.

Therefore, cost for the plug cap attachment flange can be reduced, and the number of components can be reduced, so that man-hours for assembly can also be reduced.

As a result, it is possible to provide a spark ignition engine which is advantageous in terms of cost and/or man-hours for assembly.

In this case, if the cylindrical part is constructed using a pipe material that is fitted and fixed to the mounting hole part, an unnecessary thickness due to a draft can be reduced, and further, an increase in cost due to the formation of a deep hole of cylindrical part by cutting work can also be prevented.

Further, when a punch hole corresponding to the plug hole is formed in the head cover gasket, a dedicated gasket provided between the plug cap attachment flange and the cylinder head is unnecessary. That is, it provides an advantage of reducing cost for the gasket and man-hours for assembly.

DETAILED DESCRIPTION OF PREFERRED EMBODIMENTS

An embodiment of a spark ignition engine according to the present invention will be described with reference to the drawings, taking an example in which the spark ignition engine is an industrial spark ignition engine (gasoline engine, etc.) used for agricultural machinery, construction machinery, generators, working machines, and the like.

Figure 5:
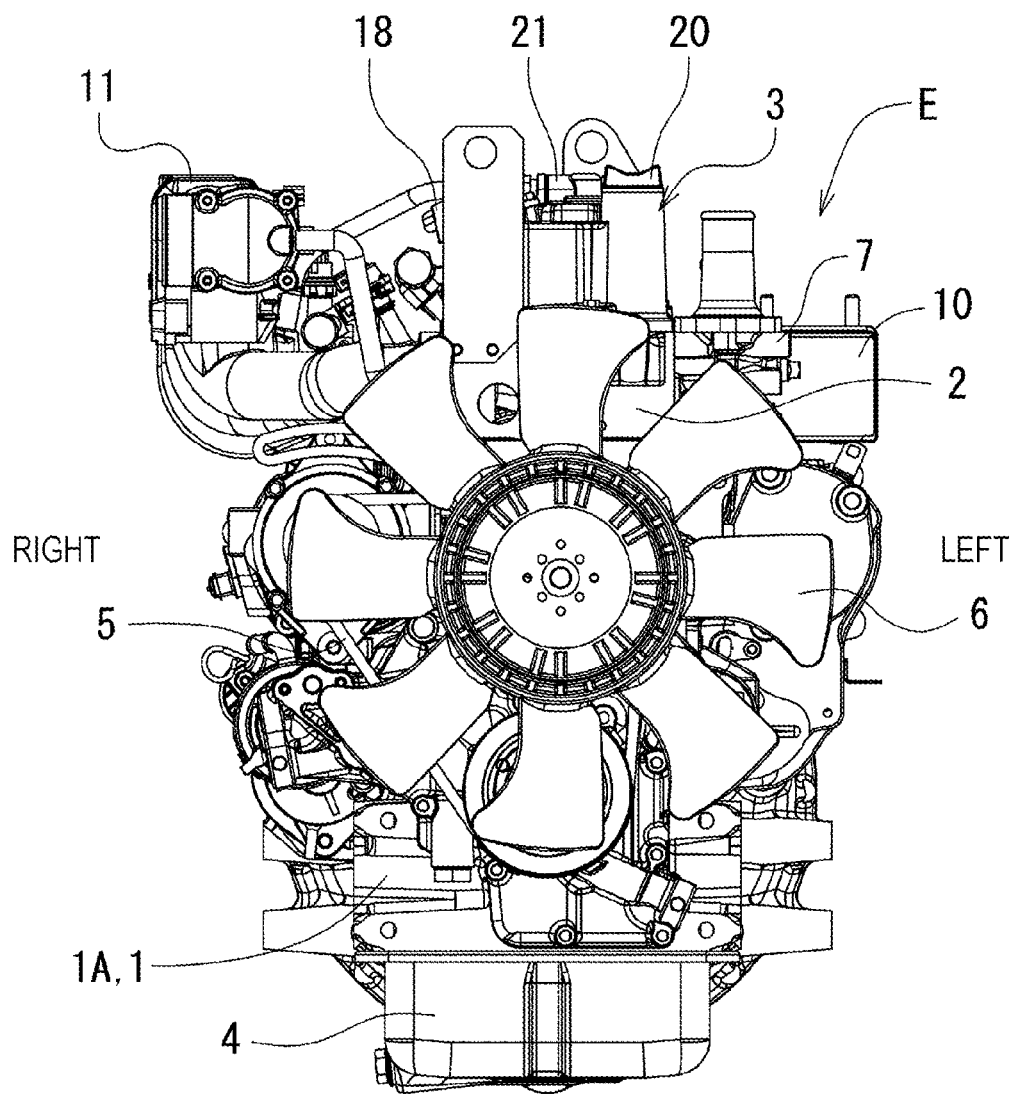
FIG. 5 is a front view of a spark ignition engine.
Figure 6:
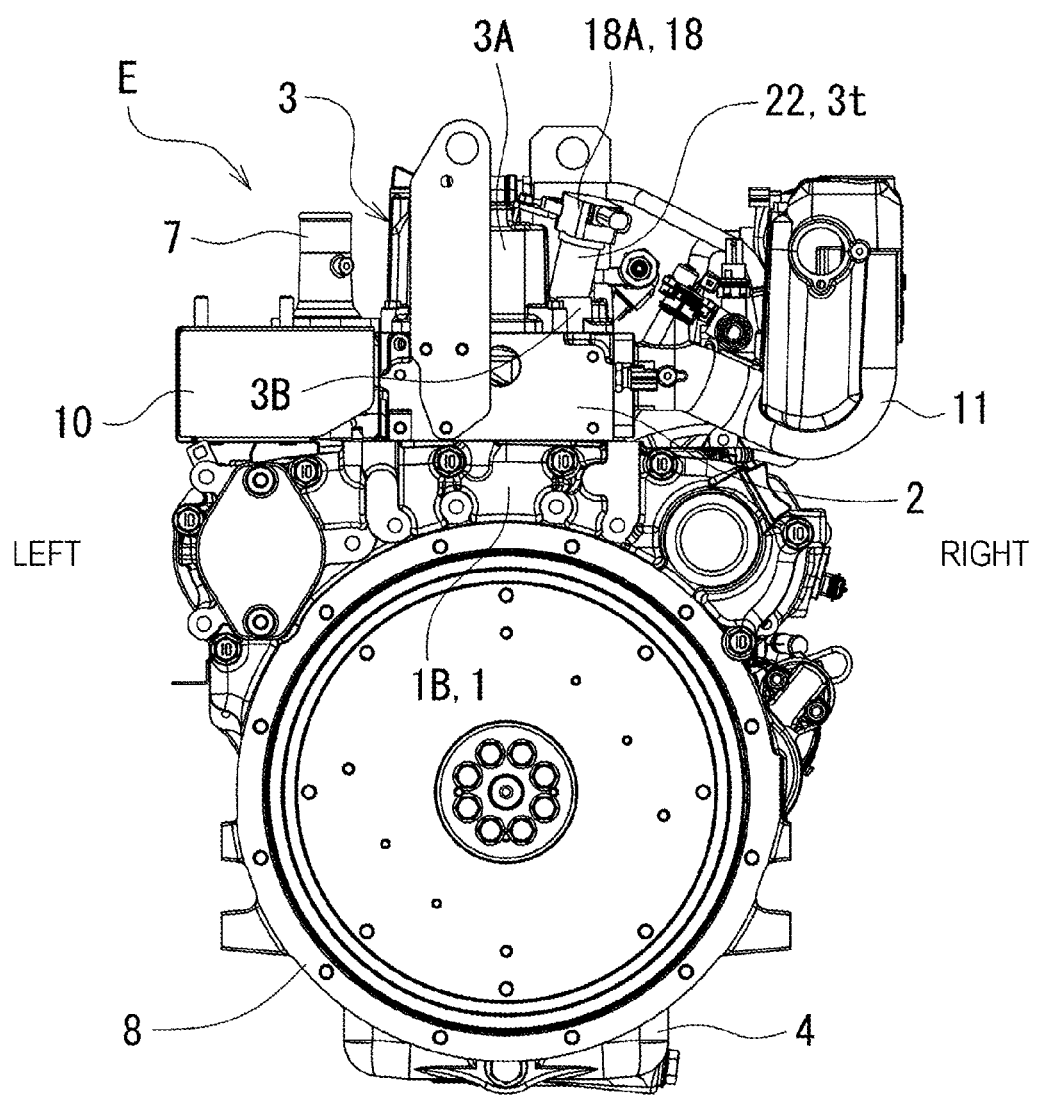
FIG. 6 is a rear view of the spark ignition engine.
Figure 7:
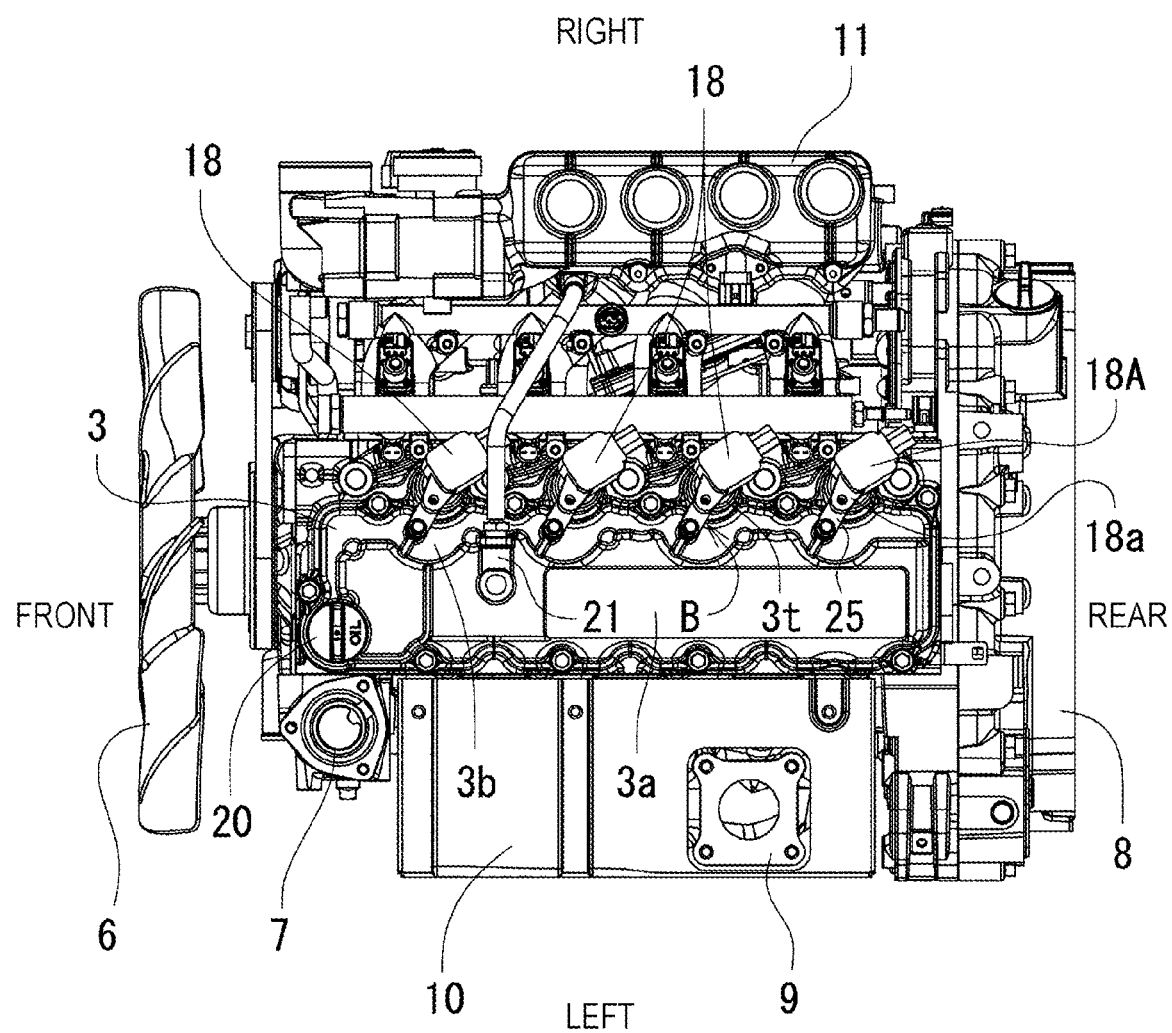
FIG. 7 is a plan view of the spark ignition engine.

As shown in FIGS. 5 to 7, a spark ignition engine E (hereinafter, simply referred to as "engine") includes a cylinder block 1, a cylinder head 2 mounted on the cylinder block, and a head cover 3 mounted on the cylinder head 2. The cylinder block 1 has a crankcase 1A below which an oil pan 4 is mounted, and a cylinder 1B which houses a piston (not shown).

The engine E is equipped with a transmission belt 5, an engine cooling fan 6, a water flange 7, and the like on the front part, and a flywheel housing 8 on the rear part.

The engine E is equipped with an exhaust manifold 9 and an exhaust cover 10 covering the exhaust manifold 9 on the upper left side, and an intake manifold 11 on the upper right side.

Figure 1:
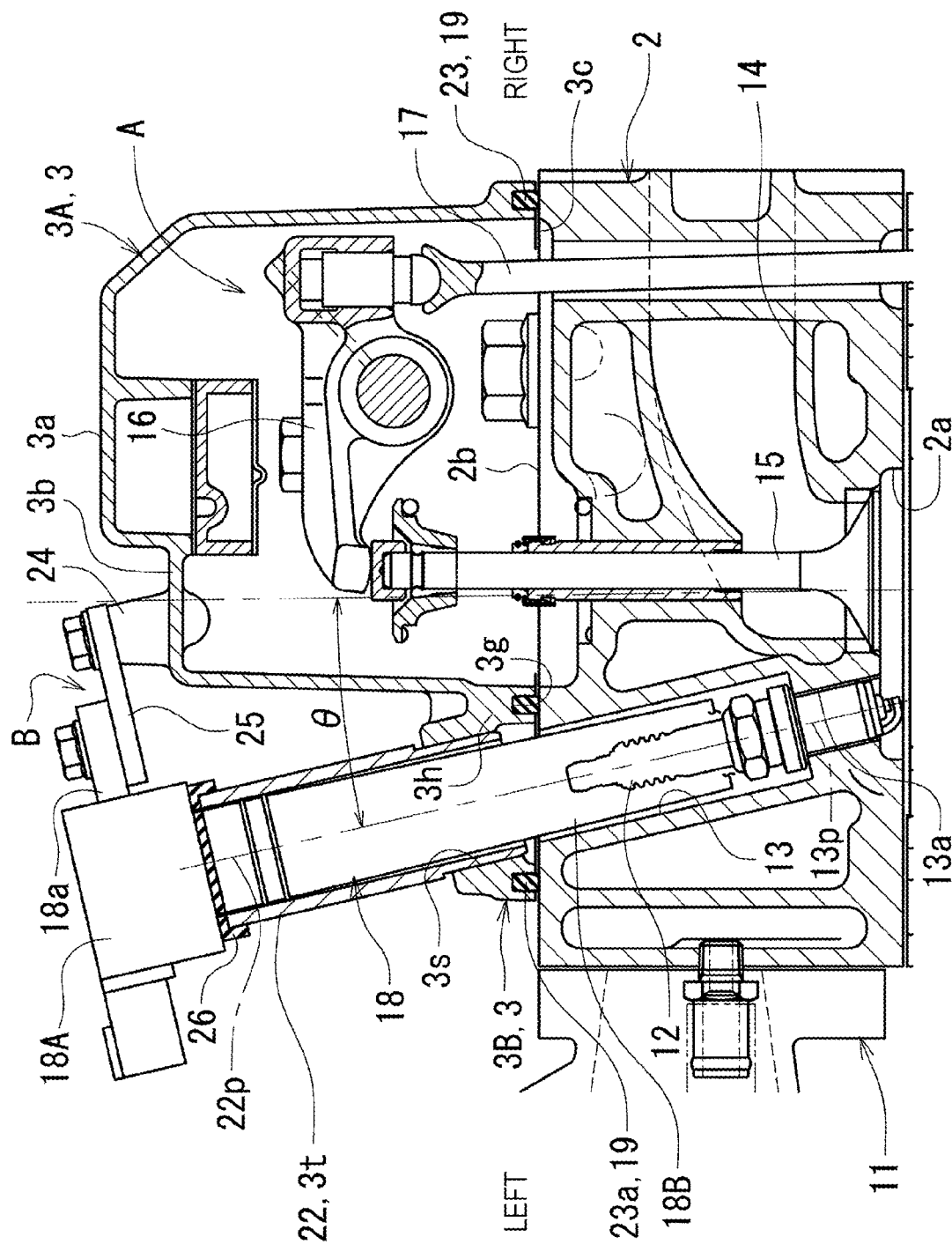
FIG. 1 is a sectional view showing a main part of an upper structure of a spark ignition engine.

As shown in FIG. 1, this engine E is equipped with a spark plug 12 as a unit for causing combustion in a combustion chamber. The cylinder head 2 is formed with a flat combustion head recess 2a and plug holes 13 having female screw holes 13a that open in the combustion head recess 2a. Each plug hole 13 which is a deep downward hole having a circular cross section, that is, a hole axis 13p, is an oblique hole slightly inclined at an inclination angle θ with respect to the vertical line.

In FIG. 1, the cylinder head 2 is formed with an exhaust port 14 that opens into the combustion head recess 2a, and is provided with a valve operating mechanism A including an exhaust valve 15, a rocker arm 16, a push rod 17, and the like. Although not shown, intake ports, intake valves, and the like are also formed in the cylinder head 2.

As shown in FIGS. 1 to 3 and 7, the head cover 3 includes a main cover part (valve operating mechanism housing part) 3A that covers the valve operating mechanism A, and a flange part 3B for supporting ignition-coil-integrated plug caps (example of a plug cap) 18. The head cover 3 is placed on an upper surface 2b of the cylinder head 2 via a head cover gasket 19 and is fixed by means of a bolt.

The main cover part 3A has: a top wall 3a provided with an oil cap 20 for an engine oil supply port (not shown) and a blow-by gas extraction part 21; and an upper wall 3b which is formed on the flange part 3B side of the top wall 3a and is slightly lower than the top wall 3a.

The flange part 3B is a portion covering four plug holes 13 arranged in the front-rear direction in the cylinder head 2, and includes a flange body part 3h connected to the main cover part 3A and four cylindrical parts 3t. Each cylindrical part 3t is formed by inserting (fitting and engaging) a pipe material 22 into a mounting hole part 3s by press fitting, the mounting hole part 3s being formed in the flange body part 3h so as to face the corresponding plug hole 13.

In the mounting hole part 3s and the cylindrical part 3t (pipe material 22), a pipe axis 22p is slightly inclined to the left at an inclination angle θ with respect to the vertical line, and the axis 22p of the mounting hole part 3s and the cylindrical part 3t coincide with the axis 13p of the plug hole 13. The head cover 3 is often made of metal such as aluminum alloy, and the cylindrical parts 3t (pipe materials 22) are often made of metal such as steel pipe.

Figure 4:
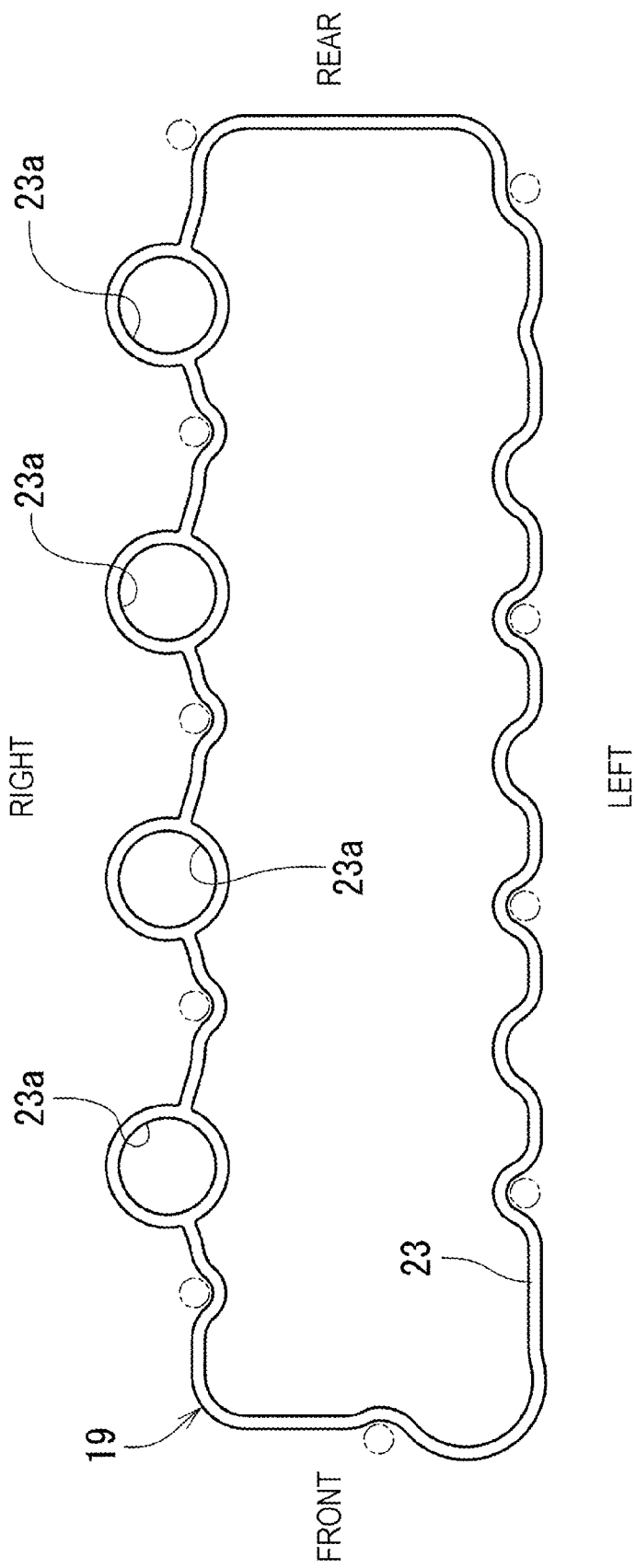
FIG. 4 is a plan view of a head cover gasket.

As shown in FIGS. 1 and 4, the head cover gasket 19 is interposed between the cylinder head 2 and the head cover 3. The head cover gasket 19 is made of rubber having a rectangular cross section, and is fitted and mounted in a gasket groove 3g opened at the bottom surface of the head cover 3.

The head cover gasket 19 is slightly compressed in the vertical direction in the gasket groove 3g when the head cover 3 is bolted to the cylinder head 2, and due to its repulsive force, a portion between the bottom surface 3c of the head cover 3 and the upper surface 2b of the cylinder head 2 is sealed. The head cover gasket 19 is formed with a main loophole 23 that surrounds the main cover part 3A and four punch holes 23a that surround the mounting hole parts 3s, respectively.

That is, cylindrical parts 3t which can support the ignition-coil-integrated plug caps 18 are formed on the head cover 3 so as to face the corresponding plug holes 13 of the cylinder head 2, and the punch holes 23a corresponding to the plug holes 13 are formed in the head cover gasket 19 provided between the cylinder head 2 and the head cover 3.

Figure 2:
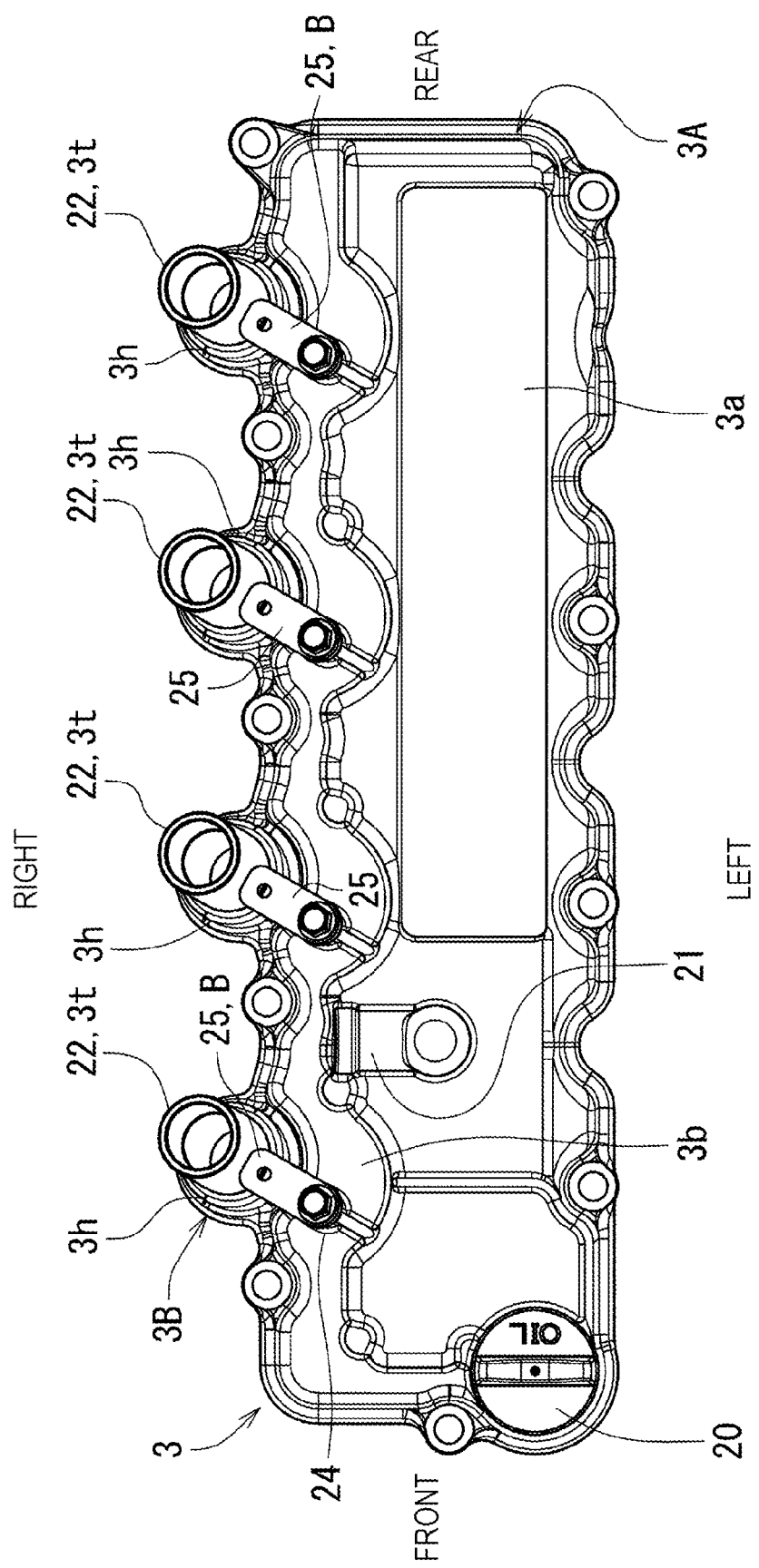
FIG. 2 is a plan view showing a head cover, etc.
Figure 3:
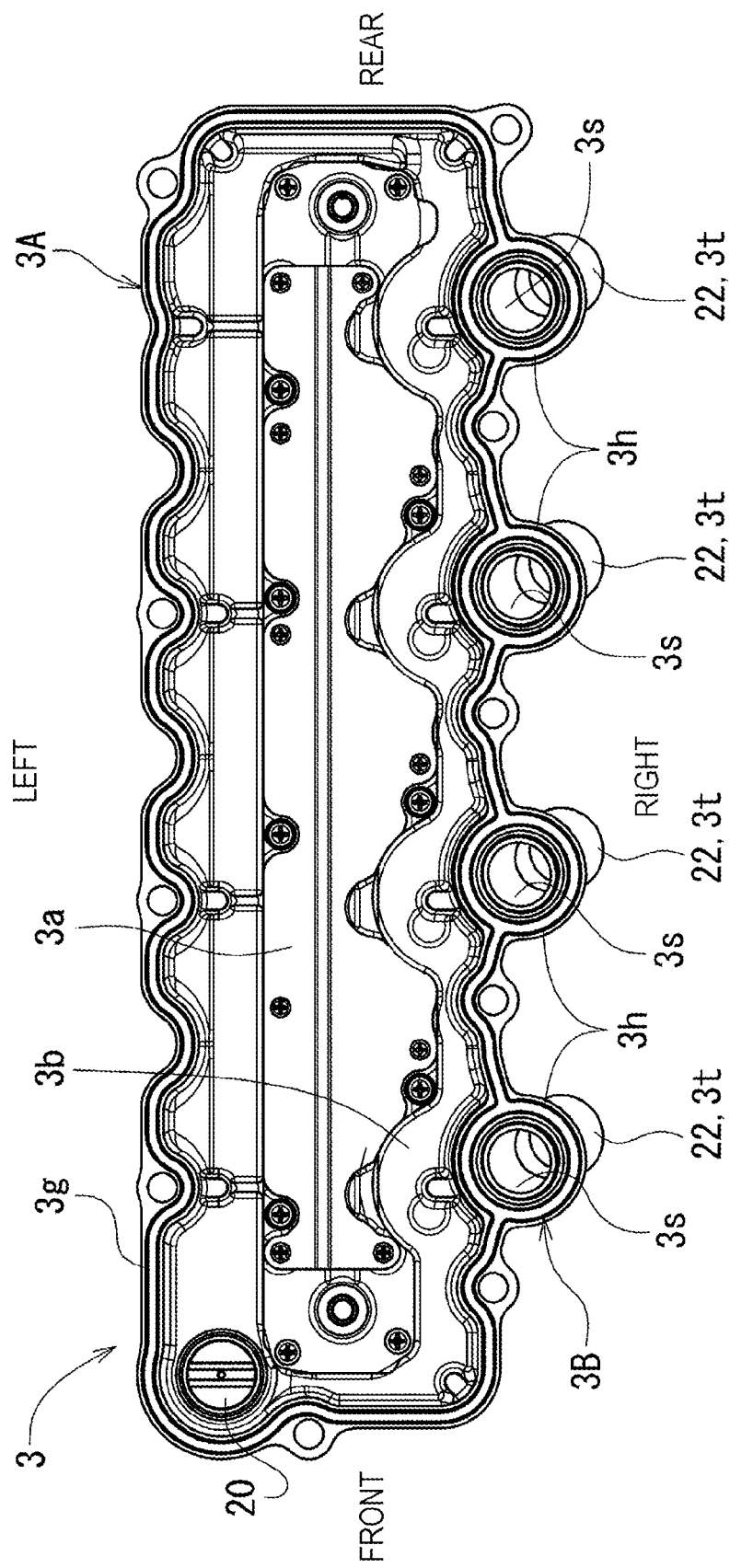
FIG. 3 is a bottom view of the head cover.

As shown in FIGS. 1, 2 and 6, fixing units B are provided on an upper wall (an example of an outer wall) of the main cover part (valve operating mechanism housing part) 3A of the head cover 3. Each of the fixing units B prevents the corresponding ignition-coil-integrated plug cap 18 supported by the cylindrical part 3t from being detached from the cylindrical part 3t.

The fixing unit B has, on the upper wall 3b, a female screw part 24 for screwing a coil housing part (igniter) 18A of the ignition-coil-integrated plug cap 18 supported by the cylindrical part 3t.

A bracket 25 screwed to the coil housing part 18A connected to the cylindrical cap part 18B is bolted to the female screw part 24, so that the ignition-coil-integrated plug cap 18 is kept supported by the cylindrical part 3t. In other words, the bracket 25 which is a plate member is screwed to a protruding part 18a of the coil housing part 18A of the ignition-coil-integrated plug cap 18 inserted into the cylindrical part 3t and the female screw part 24 on the upper wall 3b.

The ignition-coil-integrated plug cap 18 is fitted to and supported by the flange part 3B in such a way that the lower part thereof is inserted and mounted to the spark plug 12, the cylindrical cap part 18B is inserted into (internally engaged with) the plug hole 13 and the cylindrical part 3t, and a cap 26 made of a flexible material or elastic material (for example, rubber) is externally fitted to (engaged with) the upper end of the cylindrical part 3t. In addition, the coil housing part 18A is screwed to the head cover 3 using the bracket 25 to retain the ignition-coil-integrated plug cap 18.

Since the cylindrical part 3t is constructed using the pipe material 22 which is a separate member from the head cover 3, an unnecessary thickness due to a draft can be reduced, compared to a case where the cylindrical part 3t is formed on the flange part 3B by molding of the head cover, and further, an increase in cost due to the formation of a deep hole of cylindrical part by cutting work can also be prevented.

Another Embodiment

Although not shown, the cylindrical part 3t is formed by extending the flange body part 3h upward. In this case, the head cover 3 is composed of one member including the cylindrical parts 3t, and the number of components and man-hours for assembly can be further reduced as compared with the configuration according to the present embodiment. In addition, the present invention is also applicable to a spark ignition engine having a plug cap that does not integrally include an ignition coil.

Various modifications are possible. For example, cylindrical parts 3t which are separate members may be integrally provided to the flange body part 3h during molding of the head cover 3, or cylindrical parts 3t formed from the pipe material 22 may be integrated with the flange body part 3h by screwing.

What is claimed is:

1. A spark ignition engine comprising a cylindrical part capable of supporting a plug cap connected to an ignition coil, the cylindrical part being formed on a flange part of a head cover so as to correspond to a plug hole of a cylinder head,
    wherein the flange part is a portion covering the plug hole in the cylinder head and is formed continuously to a side of a main cover part that covers a valve operating mechanism.

2. The spark ignition engine according to claim 1, wherein the cylindrical part is formed by fitting and fixing a pipe material to a mounting hole part formed in the head cover, the mounting hole part facing the plug hole.

3. The spark ignition engine according to claim 2, wherein the pipe material is inserted into the mounting hole part by press fitting.

4. The spark ignition engine according to claim 1, further comprising a fixing unit that prevents the plug cap supported by the cylindrical part from being detached from the cylindrical part, the fixing unit being provided on an outer wall of a valve operating mechanism housing part of the head cover.

5. The spark ignition engine according to claim 2, further comprising a fixing unit that prevents the plug cap supported by the cylindrical part from being detached from the cylindrical part, the fixing unit being provided on an outer wall of a valve operating mechanism housing part of the head cover.

6. The spark ignition engine according to claim 3, further comprising a fixing unit that prevents the plug cap supported by the cylindrical part from being detached from the cylindrical part, the fixing unit being provided on an outer wall of a valve operating mechanism housing part of the head cover.

7. The spark ignition engine according to claim 4, wherein
the plug cap is an ignition-coil-integrated plug cap having an ignition coil, and
the fixing unit includes a female screw part for screwing a coil housing part of the ignition-coil-integrated plug cap supported by the cylindrical part, the female screw part being formed on the outer wall.

8. The spark ignition engine according to claim 5, wherein
the plug cap is an ignition-coil-integrated plug cap having an ignition coil, and
the fixing unit includes a female screw part for screwing a coil housing part of the ignition-coil-integrated plug cap supported by the cylindrical part, the female screw part being formed on the outer wall.

9. The spark ignition engine according to claim 6, wherein
the plug cap is an ignition-coil-integrated plug cap having an ignition coil, and
the fixing unit includes a female screw part for screwing a coil housing part of the ignition-coil-integrated plug cap supported by the cylindrical part, the female screw part being formed on the outer wall.

10. The spark ignition engine according to claim 7, further comprising a bracket screwed to the coil housing part, the bracket being bolted to the female screw part.

11. The spark ignition engine according to claim 8, further comprising a bracket screwed to the coil housing part, the bracket being bolted to the female screw part.

12. The spark ignition engine according to claim 9, further comprising a bracket screwed to the coil housing part, the bracket being bolted to the female screw part.

13. The spark ignition engine according to claim 1, further comprising a head cover gasket provided between the cylinder head and the head cover, the head cover gasket being formed with a punch hole corresponding to the plug hole.

14. The spark ignition engine according to claim 2, further comprising a head cover gasket provided between the cylinder head and the head cover, the head cover gasket being formed with a punch hole corresponding to the plug hole.

15. The spark ignition engine according to claim 3, further comprising a head cover gasket provided between the cylinder head and the head cover, the head cover gasket being formed with a punch hole corresponding to the plug hole.

16. The spark ignition engine according to claim 4, further comprising a head cover gasket provided between the cylinder head and the head cover, the head cover gasket being formed with a punch hole corresponding to the plug hole.

17. The spark ignition engine according to claim 5, further comprising a head cover gasket provided between the cylinder head and the head cover, the head cover gasket being formed with a punch hole corresponding to the plug hole.

18. The spark ignition engine according to claim 6, further comprising a head cover gasket provided between the cylinder head and the head cover, the head cover gasket being formed with a punch hole corresponding to the plug hole.

19. The spark ignition engine according to claim 7, further comprising a head cover gasket provided between the cylinder head and the head cover, the head cover gasket being formed with a punch hole corresponding to the plug hole.

20. The spark ignition engine according to claim 8, further comprising a head cover gasket provided between the cylinder head and the head cover, the head cover gasket being formed with a punch hole corresponding to the plug hole.

\* \* \* \* \*